(12) United States Patent
Kim et al.

(10) Patent No.: US 7,990,084 B2
(45) Date of Patent: Aug. 2, 2011

(54) LINEAR STEPPING MOTOR

(75) Inventors: Seung-Jong Kim, Seoul (KR); Jong Min Lee, Seoul (KR); Woo Yeon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 296 days.

(21) Appl. No.: 12/477,201

(22) Filed: Jun. 3, 2009

(65) Prior Publication Data

US 2009/0302786 A1    Dec. 10, 2009

(30) Foreign Application Priority Data

Jun. 4, 2008    (KR) ........................ 10-2008-0052551

(51) Int. Cl.
*H02K 41/00* (2006.01)

(52) U.S. Cl. ................... 318/135; 310/12.17; 310/12.24

(58) Field of Classification Search .................. 318/135; 310/12.1–12.33
See application file for complete search history.

(56) References Cited

U.S. PATENT DOCUMENTS

| 4,690,066 A | * | 9/1987 | Morishita et al. | 104/282 |
| 5,058,505 A | * | 10/1991 | Uehira | 104/284 |
| 6,094,255 A | * | 7/2000 | Ota | 355/75 |

FOREIGN PATENT DOCUMENTS

| JP | 63-31940 | * | 2/1988 | 318/135 |
| JP | 5-328536 | * | 12/1993 | |
| JP | H05-328536 | | 12/1993 | |
| JP | 2003-52164 | * | 2/2003 | |
| KR | 10-0426616 | | 4/2004 | |
| KR | 10-0508849 | | 8/2005 | |
| KR | 10-0542851 | | 1/2006 | |

* cited by examiner

*Primary Examiner* — Thomas Dougherty
(74) *Attorney, Agent, or Firm* — Bacon & Thomas, PLLC

(57) ABSTRACT

A linear motor includes a stator having teeth symmetrically formed on upper and lower surfaces thereof at regular pitch; a movable member including upper cores disposed above the stator, lower cores disposed below the stator in symmetrical with the upper cores, and yoke parts connecting the upper and the lower cores around the stator, wherein the upper and lower cores have upper and lower coils wound therearound, respectively; at least one gap sensor to detect the gap between the stator and the upper or lower core and the inclination of the movable member; a controller performing the levitation control by adjusting the amplitudes of currents applied to the upper and lower coils, based on the gap variation, and driving the linear motion by changing the current phases; and a multichannel voltage-to-current power amplifier of which each channel is connected to each coil of the upper and lower cores.

5 Claims, 8 Drawing Sheets

LINEAR STEPPING MOTOR

FIELD OF THE INVENTION

The present invention relates to a linear motor for linear driving, and more particularly, to a bearingless linear stepping motor, in which a movable member can move while keeping a predetermined gap from a stator without contact with no additive guide or bearing members.

BACKGROUND OF THE INVENTION

A linear stepping motor that is used to directly obtain a linear driving force can linearly moves a movable member by a predetermined pitch in accordance with input currents step by step. Therefore, the linear stepping motor inherently has a self positioning function, and positioning can be performed with an open-loop control system.

In the linear stepping motor, a support member for a movable member should be essentially provided in order to uniformly maintain a gap between the stator and the movable member. Examples of the support member include a mechanical support member which uses a linear bearing, a roller, or a linear guide, a pneumatic support member which applies pneumatic pressure into the gap between the stator and the movable member to keep the gap uniformly, and a magnetic levitation-type support member which supports the movable member without contact by controlling magnetic forces.

As a prior art to this invention, a double-sided linear stepping motor will be described referring to FIGS. 1 to 3.

FIG. 1 is a perspective view partially showing the double-sided linear stepping motor according to a prior art. FIG. 2 is a side sectional view showing a stator and movable members of the linear stepping motor shown in FIG. 1. The linear stepping motor shown in FIGS. 1 and 2 uses a mechanical support member.

FIG. 1 shows a state where a left yoke and a housing of a stator 40 are removed so that the structures of a stator 40, and upper and lower movable members 10 and 20 are exposed. As shown in FIGS. 1 and 2, the linear stepping motor includes an upper movable member 10 that has two cores 11 and 11' protruding downward; a lower movable member 20 that has two cores 21 and 21' protruding upward; two upper coils 30 and 30' that are wound around the upper cores 11 and 11' of the upper movable member 10, respectively; two lower coils 31 and 31' that are wound around the lower cores 21 and 21' of the lower movable member 20, respectively; and a flat plate-shaped stator 40 that is located between the upper movable member 10 and the lower movable member 20. The upper movable member 10 and the lower movable member 20 are connected to each other by a yoke 50, and move together with the stator 40 interposed between. A plurality of teeth 12 and 12' are formed at lower ends of the upper cores 11 and 11', respectively, to protrude downward at regular pitch. Symmetrically, a plurality of teeth 22 and 22' are formed at upper ends of the lower cores 21 and 21', respectively, to protrude upward at regular pitch, too. And many teeth 41 are symmetrically formed on the upper and lower surfaces of the stator 40 at regular pitch.

A guide 51 is extended from the yoke 50, and movably supported by many roller bearings 62 which are fitted in a guide rail 13 fixed to a housing 60.

FIG. 3 is a graph showing the phase of current applied to each coil shown in FIGS. 1 and 2. In FIG. 3, an A-phase current is applied to the first upper coil 30 and the first lower coil 31. A B-phase current is applied to the second upper coil 30' and the second lower coil 31'. An electro-magnetic field generated by the currents has four modes in accordance with a phase difference between the A-phase current and the B-phase current. Electro-magnetic forces between the stator and the movable members are changed at a predetermined cycle depending on the modes of the electro-magnetic field, which leads to the linear movement of the movable members by a predetermined pitch. Referring to FIGS. 1 and 2, it is clear that the movable members moves by ¼ pitch due to a relative position between the teeth of the stator 40 and the movable members each time the input electro-magnetic field is switched in mode.

As will be apparent from FIG. 1, in order to keep constant air gap between the stator and the movable members, the guide 51, the guide rail 13, and a roller 62 inserted between them are essentially provided. But such a mechanical support member often causes friction and lubrication problems. Instead of mechanical support members, other support members such as air bearings or linear magnetic bearings may be used. However, the addition of such a non-contact support member causes a complex and bulky structure of the linear stepping motor system.

SUMMARY OF THE INVENTION

The present invention has been proposed in order to solve the above-described problems, and the object of the invention is to provide a linear stepping motor in which a movable member is accurately controlled so as to be magnetically levitated and to keep a constant gap from a stator without any additional support members such as linear magnetic bearing or air bearing.

Thus it may be named as a bearingless linear stepping motor. The linear stepping motor by this invention has the same structure as a conventional double-sided linear stepping motor, and their linear driving principles are also quite similar to each other. That is, the movable member moves by a predetermined pitch according to the same phase change of currents symmetrically applied to both-side cores. However, the proposed linear motor differs from the conventional one in that it controls the attractive magnetic forces acting on both sides of the stator so as to keep the both-side gaps equal for the levitation of the movable member.

In accordance with an aspect of the invention, there is provided a linear stepping motor including: a plate-shaped stator having a plurality of teeth symmetrically formed on upper and lower surfaces thereof at regular pitch; a movable member which includes a plurality of upper cores disposed above the stator, a plurality of lower cores disposed below the stator in symmetrical with the upper cores, and yoke parts connecting the upper and the lower cores around the stator, wherein the upper and lower cores have upper and lower coils individually wound around thereof, respectively; at least one non-contact type gap sensor to detect the gap between the stator and the upper or lower core; a controller calculating voltages for levitation and linear movement of the movable member, based on the gap variation; and a multi-channel voltage-to-current power amplifier having a plurality of channels, each channel being connected to each coil of the upper and lower cores, respectively.

Herein, the currents applied to the upper and lower coils may be periodic phase currents. For instance, when three-phase currents are used, the phase difference between adjacent coils is 120 degrees and thus the number of cores should be a multiple of three. In this case, the upper and lower cores of the movable member may be arranged at ⅘ pitch with respect to the regular pitch of the teeth formed on the stator surface, symmetrically. On the other hands, the upper and lower cores may have a plurality of teeth formed on their end surfaces at the same pitch as the stator teeth, while the upper and lower cores may be arranged so that the teeth of each core are misaligned by ⅓ pitch with respect to the teeth of its adjacent cores, symmetrically.

In the linear stepping motor of the present invention, the principle of levitation control is as follows.

At a normal state where the upper- and lower-side gaps are equal to each other, the currents applied to the upper and lower coils have the same amplitude as well as the same phase distribution, symmetrically. These currents generate attractive electro-magnetic forces acting between the stator and the upper and lower cores across the gaps. Since the electro-magnetic force increases as the gap gets narrower, if there is no feedback controller, the upper or lower core will adhere to the stator plate. For the stable levitation, after the gap between the stator and the upper or lower core is measured by the gap sensor, the controller calculates a proper control current based on the variation of the gap. For instance, when the movable member goes down, the control current calculated in proportion to the displacement and velocity of the movable member is added to the amplitude of phase currents of the lower cores getting away from the stator, and subtracted from the amplitude of the phase currents of the upper cores getting near to the stator.

While controlling the current amplitudes of the upper and lower cores for levitation, the controller changes the current phases of the upper and lower cores in symmetrical with respect to the stator, to drive the linear motion of the movable member along the stator. For this linear motion generation, a feedback control is not needed.

In other directional motions except for the linear driving direction (horizontal) and levitation direction (vertical), yawing motion and lateral translational motion are passively stable, premising the stable levitation control as described above, even though the stiffness and the damping in the directions are very low. However, the rolling and pitching motions are unstable even during the stable levitation. To achieve the stability in those directions, more than one linear stepping motor may be combined in parallel or serial.

On the other hand, to increase the thrust force and the levitation stiffness, the linear stepping motor may include permanent magnets inserted into the stator according to the center line, so that the upper and lower surfaces of the stator have magnetic polarities of N and S, respectively. Then, the path of flux generated by the permanent magnets becomes 'N pole of permanent magnet→teeth on the upper surface of the stator→upper air gap→upper cores→yoke parts→lower cores→lower air gap→teeth on the lower surface of the stator→S pole of permanent magnet'. Its levitation principle and linear driving method are basically the same with the previous case without permanent magnets. In this case, however, the currents applied to the upper and lower cores are not symmetrical any longer. Due to the polarities of permanent magnets, the currents should have an opposite sign with each other, and further, they may have offsets.

Furthermore, permanent magnets may be also inserted in the yoke parts connecting the upper and lower cores. In this case, because the path of flux generated by permanent magnets is the same as before, the principles of levitation and linear driving method may be the same as before, too.

According to the present invention, a non-contact, friction-less and lubrication-free linear motor can be achieved with no bearing or guide members. Compared to a double-sided linear motor with additional linear magnetic bearings, the invented linear motor has some advantages such as small size, compact structure, low power consumption and high efficiency.

BRIEF DESCRIPTION OF THE DRAWINGS

The above and other features of the invention will become apparent from the following descriptions of embodiments given in conjunction with the accompanying drawings, in which.

DETAILED DESCRIPTION OF THE EMBODIMENTS

Figure 1:
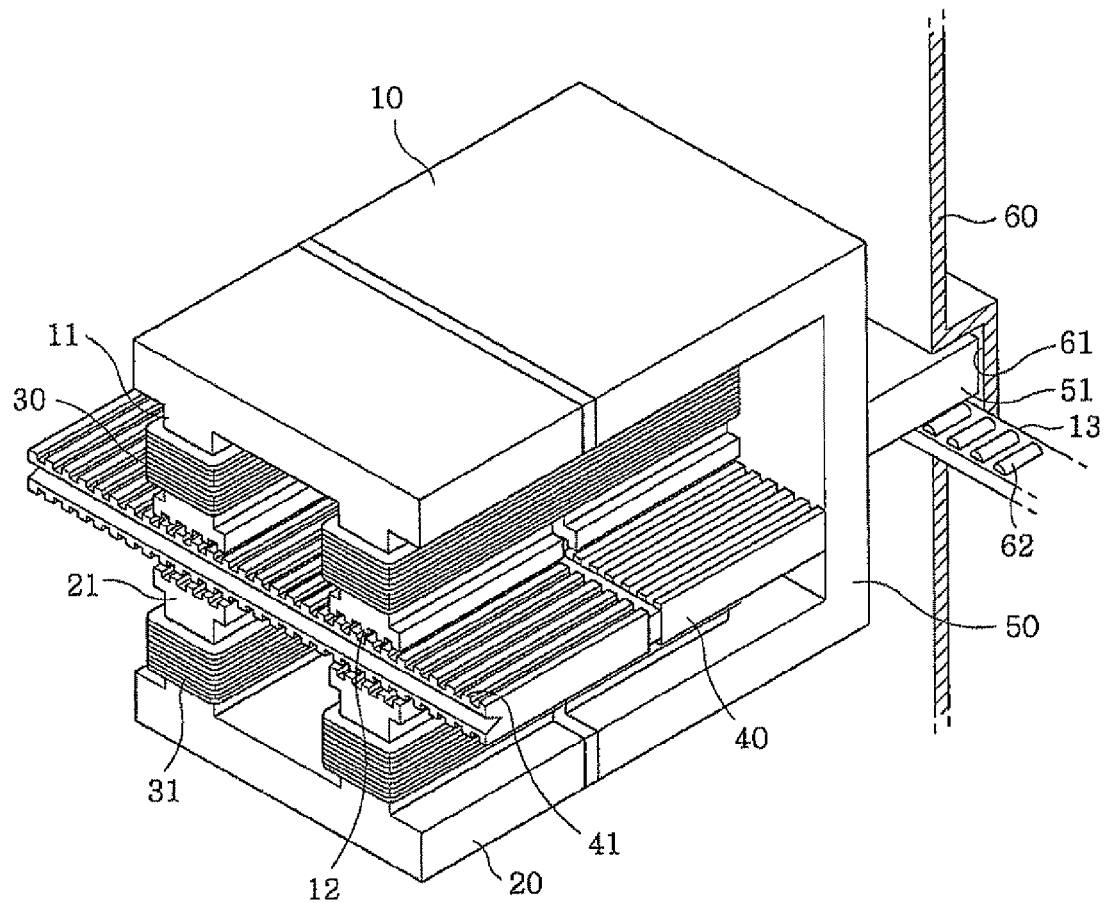
FIG. 1 is a perspective view partially showing a linear stepping motor according to a prior art.
Figure 2:
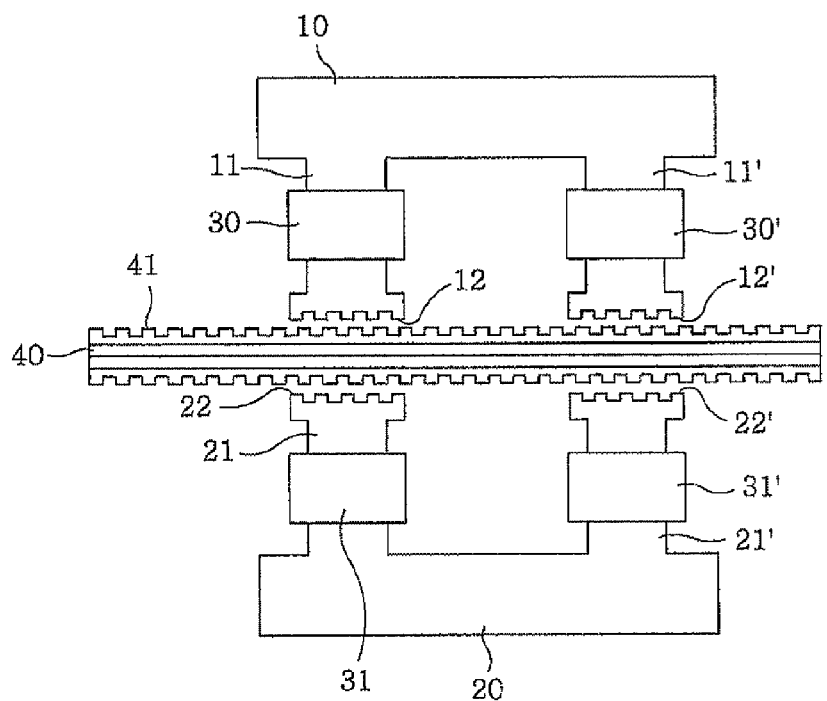
FIG. 2 is a side-sectional view showing movable members and a stator of the linear stepping motor shown in FIG. 1.
Figure 3:
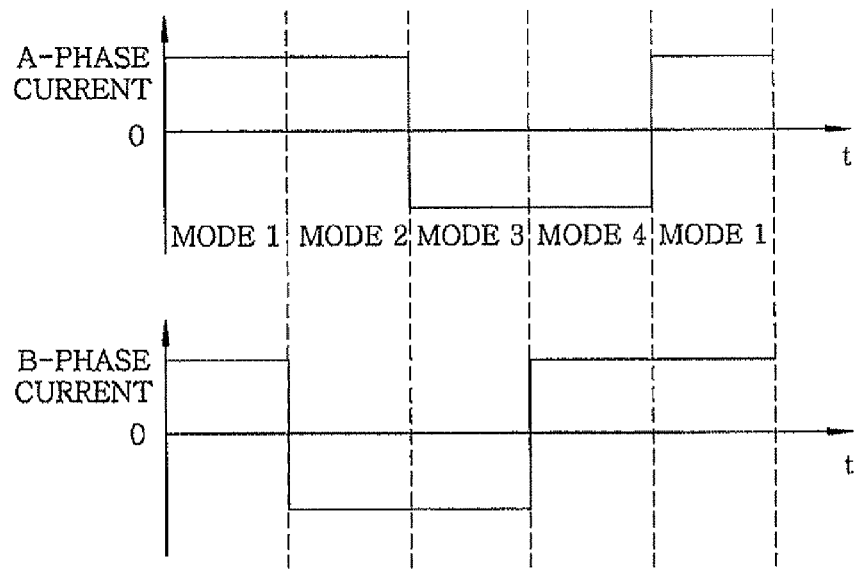
FIG. 3 is a graph showing the phase of currents applied to each coil shown in FIGS. 1 and 2.

Hereinafter, a bearingless linear stepping motor in accordance with the present invention will be described with reference to the accompanying drawings. Throughout the drawing figures, like reference numerals refer to like parts, unless otherwise indicated.

Figure 4:
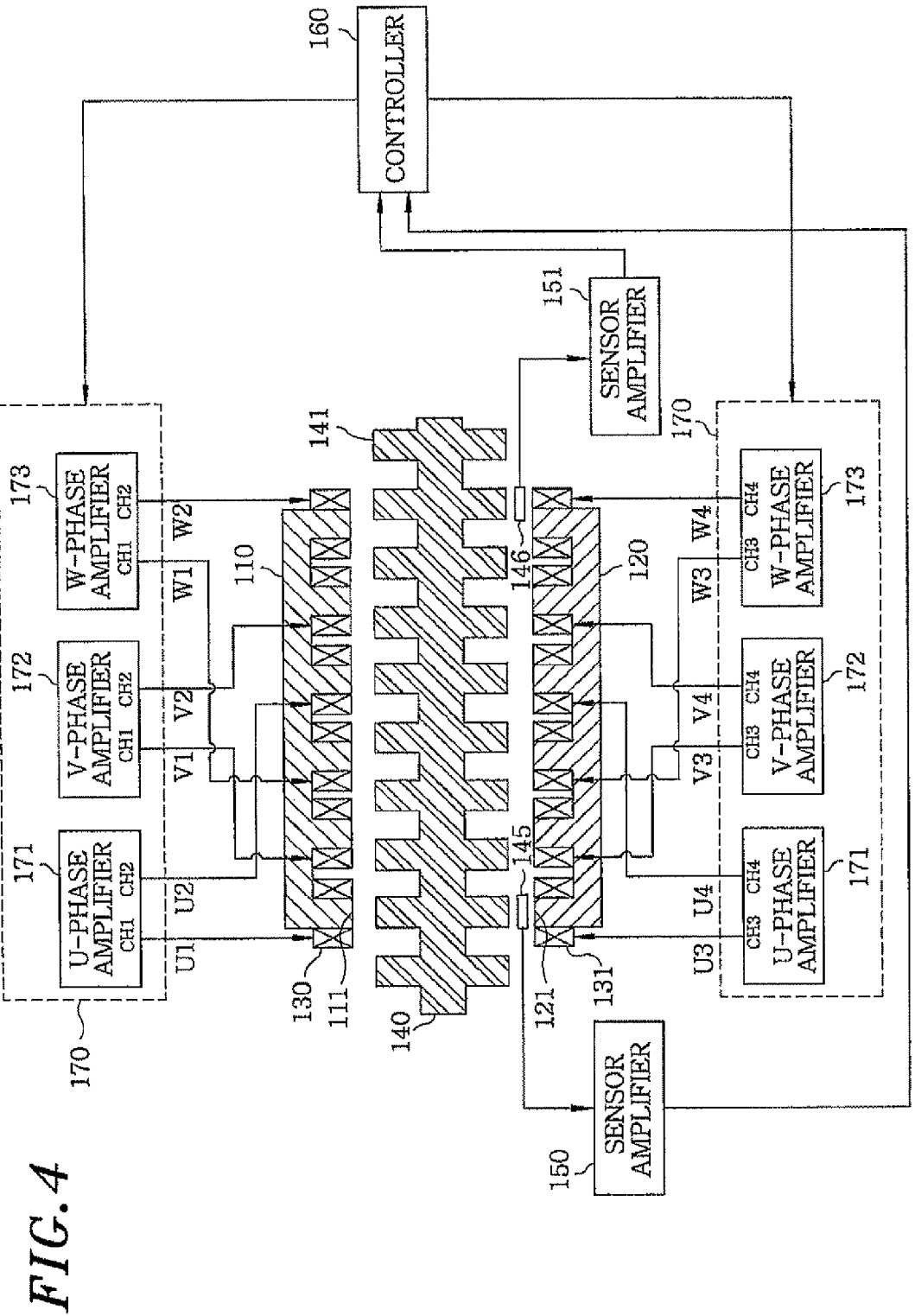
FIGS. 4 and 5 are a side-sectional view and a front-sectional view of a bearingless linear stepping motor according to the first embodiment of the present invention, respectively.
Figure 5:
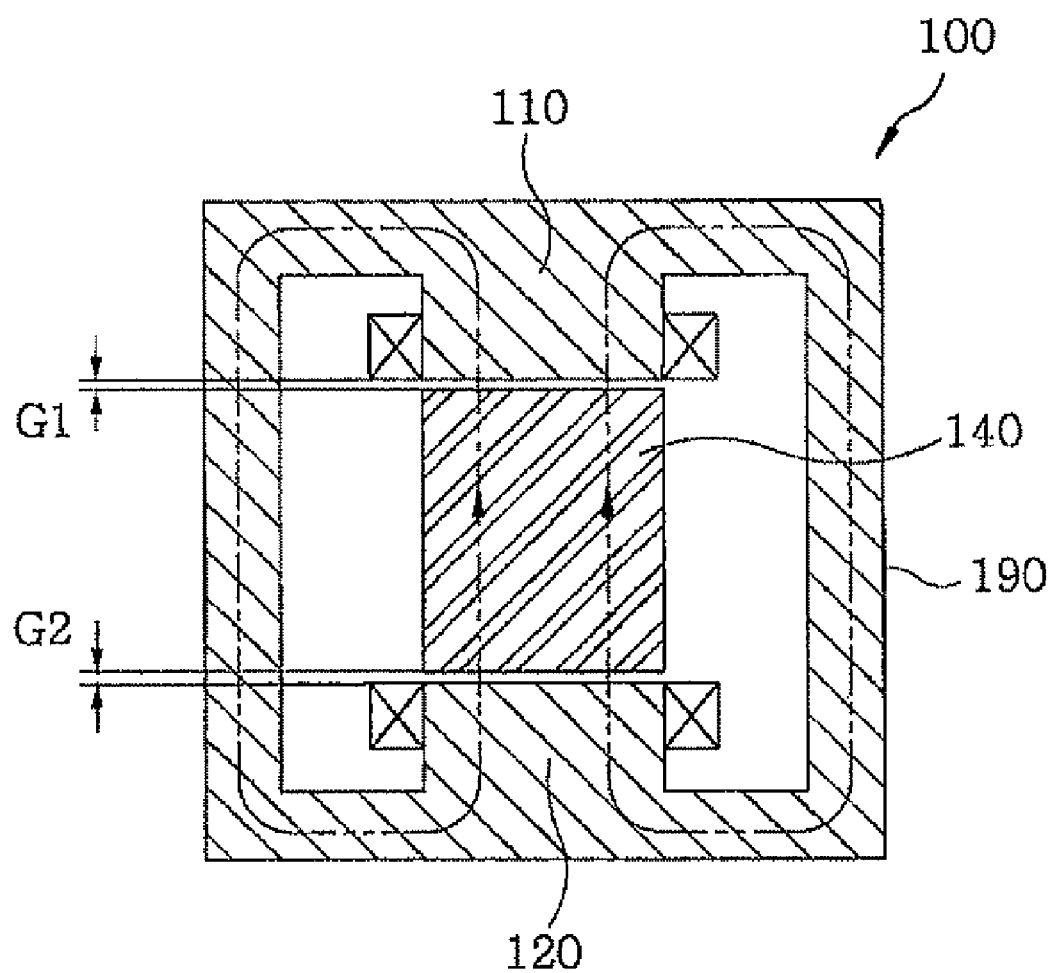

FIGS. 4 and 5 are the side-sectional view and the front-sectional view of the bearingless linear stepping motor according to the first embodiment of the present invention, respectively.

As shown in FIGS. 4 and 5, the bearingless linear stepping motor includes: an upper part 110 of a movable member 100 that has a plurality of upper cores 111 protruding downward; a plurality of upper coils 130 that are individually wound around the upper cores 111; a lower part 120 of the movable member 100 that has a plurality of lower cores 121 protruding upward; a plurality of lower coils 131 that are individually wound around the lower cores 121; a long and flat plate-shaped stator 140 that is disposed between the upper core 111 and the lower core 121; and yoke parts 190 that connects the upper part 110 and the lower part 120 of the movable member 100 around the stator 140. Teeth 141 are formed on the upper and the lower surfaces of the stator 140 to symmetrically protrude upward and downward at regular pitch. The upper cores 111 and the lower cores 121 are arranged to be opposed to each other in symmetric with respect to the stator 140. Therefore, electro-magnetic forces are generated from the upper and lower cores in opposite directions.

In this embodiment, for smooth linear movement without cogging, a three-phase AC current may be used instead of a square-wave current. The phase currents applied to the upper coils 130 and the lower coils 131 should have the same phase distribution as in a conventional double-sided linear stepping motor. Meanwhile, their amplitudes should be adjusted according to the variation of air gap to achieve the stable levitation. When the three-phase currents are used, the number of cores should be the multiple of three, and U-, V-, and W-phase currents are applied to the cores, in turn. In this embodiment, the number of the cores is six at each side. And the pitch of the upper and lower cores of the movable member 100 is set to be ⅔ of the regular pitch of the teeth 141 formed on the stator surfaces. That is, three cores of the movable member correspond to four teeth 141 of the stator 140. Then, for a half cycle of a phase current, the movable member 100 is moved in horizontal direction by one pitch of the stator teeth, which is because one cycle of phase current makes two cycles of electro-magnetic force, since the electro-magnetic force is in proportion to the square of current.

Figure 6:
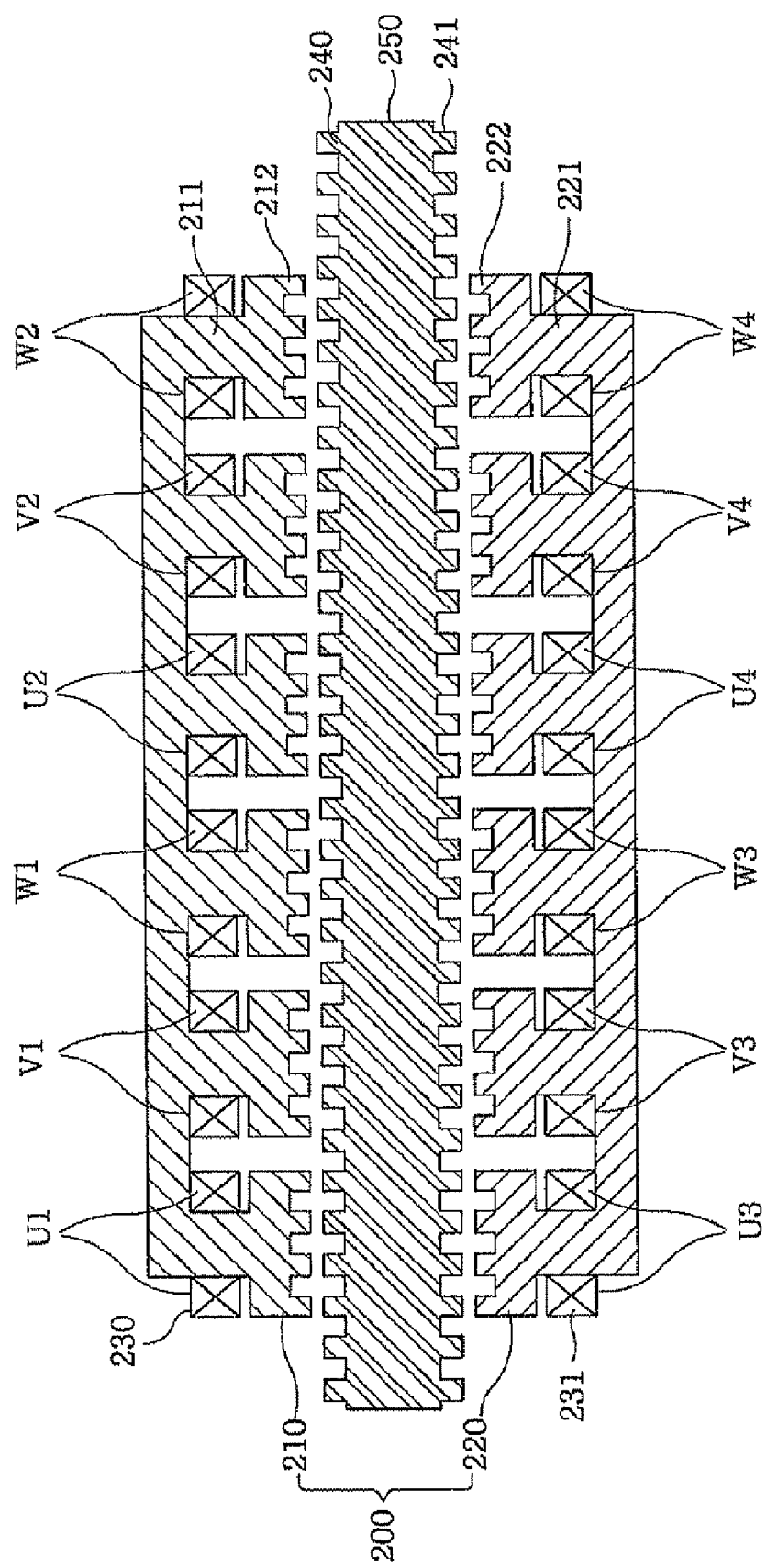
FIG. 6 is a side-sectional view of a bearingless linear stepping motor according to the second embodiment of the present invention.

As the second embodiment shown in FIG. 6, the bearingless linear motor of this invention may have several teeth 212 and 222 formed on each core 211 and 221 of the upper and lower parts 210 and 220 of a movable member 200, protruding toward a stator 250 in symmetrical with respect to the stator 250. The core-side teeth 212 and 222 have the same pitch with the stator teeth 240 and 241, but each core is arranged so as to be misaligned with its adjacent cores by a third of the pitch. That is, while the teeth 212 and 222 of each core are arranged at regular pitch which is the same as the stator teeth 240 and 241, the interval between the cores 211 and 221 is set to be ⅚ of the pitch. Then the movable member 200 moves by two pitches of the teeth per one cycle of a phase current as before. In this embodiment, compared to FIG. 4, the moving distance for a cycle of a phase current is decreased due to the small pitch of the teeth, but the thrust force is increased reversely.

On the other hand, the smaller the gap between the stator 140 and the cores 211 and 221 is, the larger the attractive electro-magnetic force generated between them gets. That is, but for a feedback control, the movable member 100 will adhere to the upper or lower surface of the stator 140. In FIG. 4 or 6, in order to keep the air gap, that is, to achieve the stably levitated state of the movable member 100 (or 200), the amplitudes of AC currents applied to the coils 130 and 131 (or 230 and 231) have to be controlled based on the gap variation.

To this end, the bearingless linear stepping motor further includes several gap sensors 145 and 146, a controller 160, and a multi-channel amplifier 170. The gap sensors 145 and 146, each of which may be a proximity probe and a sensor amplifier 150 or 151, detect the averaged gap G1 or G2 between the stator 140 and the upper 111 or lower core 121, and the inclination angle of the movable member 100 as well.

The controller 160 generates a control voltage for levitation according to the gap variation, which is then added to or subtracted from the amplitudes of voltages to be applied to the upper and lower coils 130 and 131. The multi-channel amplifier 170 connected to the controller 160 is a voltage-to-current amplifier. Each channel of the amplifier 170 is connected to each coil 130 and 131 of the upper and lower cores 111 and 121, and separately applies a phase current to the coil. In this embodiment, the connection order is as follows: sequentially from left, U1, V1, W1, U2, V2, W2 channels for the upper coils 130; and U3, V3, W3, U4, V4, W4 channels for the lower coils 131. As described before, when a three-phase current is used, three cores can form a group. This embodiment has four groups of cores and the channel number of the power amplifier 170 means the group number. The currents applied to three cores consisting of a group have the same amplitude, but the amplitude of the currents of each group is controlled according to the gap variation, and a pair of the opposite groups can control one directional (or one degree-of-freedom) motion. Since this embodiment has two pairs of groups opposite to each other, two degree-of-freedom motions can be controlled, wherein the two degree-of-freedom motions include the vertical translation which is the levitation direction and the pitching motion which is a rotating motion on the axis perpendicular to the cross section shown in FIG. 4.

For example, when the upper gap G1 increases and thus the lower gap G2 decreases, the control current calculated in the controller 160 is added to the amplitudes of the currents applied to the two upper core groups (that are CH1 and CH2), and subtracted from the amplitudes of the currents applied to the two lower core groups (that are CH3 and CH4). Then, the electro-magnetic force generated in the upper cores increases and the force generated in the lower cores decreases, which results in the return of the movable member to its original position.

And furthermore, when the movable member is inclined counterclockwise so that the average gaps of CH1 and CH4 group cores decrease and the average gaps of CH2 and CH3 group cores increase, the control current calculated on the basis of the inclination angle is added to the amplitudes of currents flowing in the coils of the CH2 and CH3 groups, and subtracted from the amplitudes of currents flowing in the coils of the CH1 and CH4 groups. Then, the moment of the forces acting clockwise is produced, which resultantly makes the gap uniform.

Figure 7:
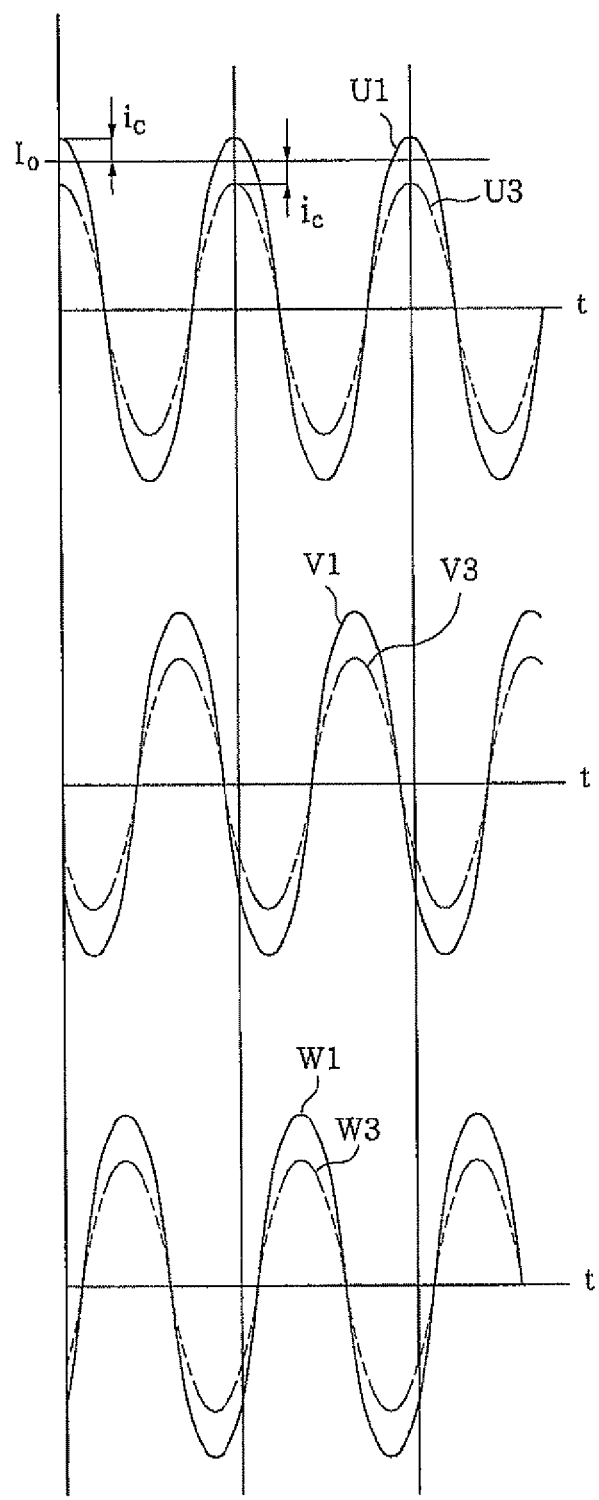
FIG. 7 is a graph showing currents applied to upper and lower coils for levitation control when the movable members are moved downward with respect to a stator shown in FIGS. 4, 5 and 6, during linear movement at constant speed.

FIG. 7 shows currents to be applied to the coils of the CH1 and CH3 groups when the upper gap G1 is larger than the lower gap G2. In FIG. 7, $I_0$ denotes the amplitude of the normal 3-phase current to be applied to each coil in a normal state where the gap G1 equals to the gap G2, and $i_c$ denotes the control current. The currents to be applied to three coils belonging to the CH1 group can be expressed as follows, which are indicated by solid lines in FIG. 7.

$$U1=(I_0+i_c)\times\cos(wt)$$

$$V1=(I_0+i_c)\times\cos(wt+2\pi/3)$$

$$W1=(I^0+i_c)\times\cos(wt+4\pi/3) \quad \text{[Equation 1]}$$

And the currents to be applied to three coils belonging to the CH3 group are as follows, which are indicated by broken lines in FIG. 7.

$$U3=(I_0-i_c)\times\cos(wt)$$

$$V3=(I_0-i_c)\times\cos(wt+2\pi/3)$$

$$W3=(I_0-i_c)\times\cos(wt+4\pi/3) \quad \text{[Equation 2]}$$

where, w is related to the moving velocity v of the movable member; $w=2\pi v/p$ where p is the pitch of the teeth, and t means a discretized time; $t=k\Delta T$ where $\Delta T$ is a sampling time in the controller and k is an integer. Increase or decrease of k determines the direction of linear horizontal movement. As noted in the above Equations, the currents applied to two coils opposite to each other have the same phase, but their amplitudes are increased or decreased from the normal value $I_0$ by the control current $i_c$ for the levitation.

FIG. 7 illustrates the case that the difference between G1 and G2 is constant, which means the control current $i_c$ is constant, and that the movable member is moving at a constant speed, which means w is also constant. In the case that the movable member is levitated but at standstill, wt in the above Equations is set to be a constant value, which means that the levitation control is not concerned with the phases of currents at all, but with only the amplitudes, In the manner as described above, the linear stepping motor shown in FIG. 4 or 6 can actively control the vertical translation and the pitching motion of the movable member for stable levitation without any additive actuating members. Other directional motions such as yawing motion and lateral translational motion are passively stable, premising the stability of levitation control as described above, even though the stiffness and the damping in the directions are very low. On the other hand, the rolling motion may be still unstable. To achieve the stability in this direction, it may be needed to combine more than one bearingless linear stepping motor in parallel.

Figure 8:
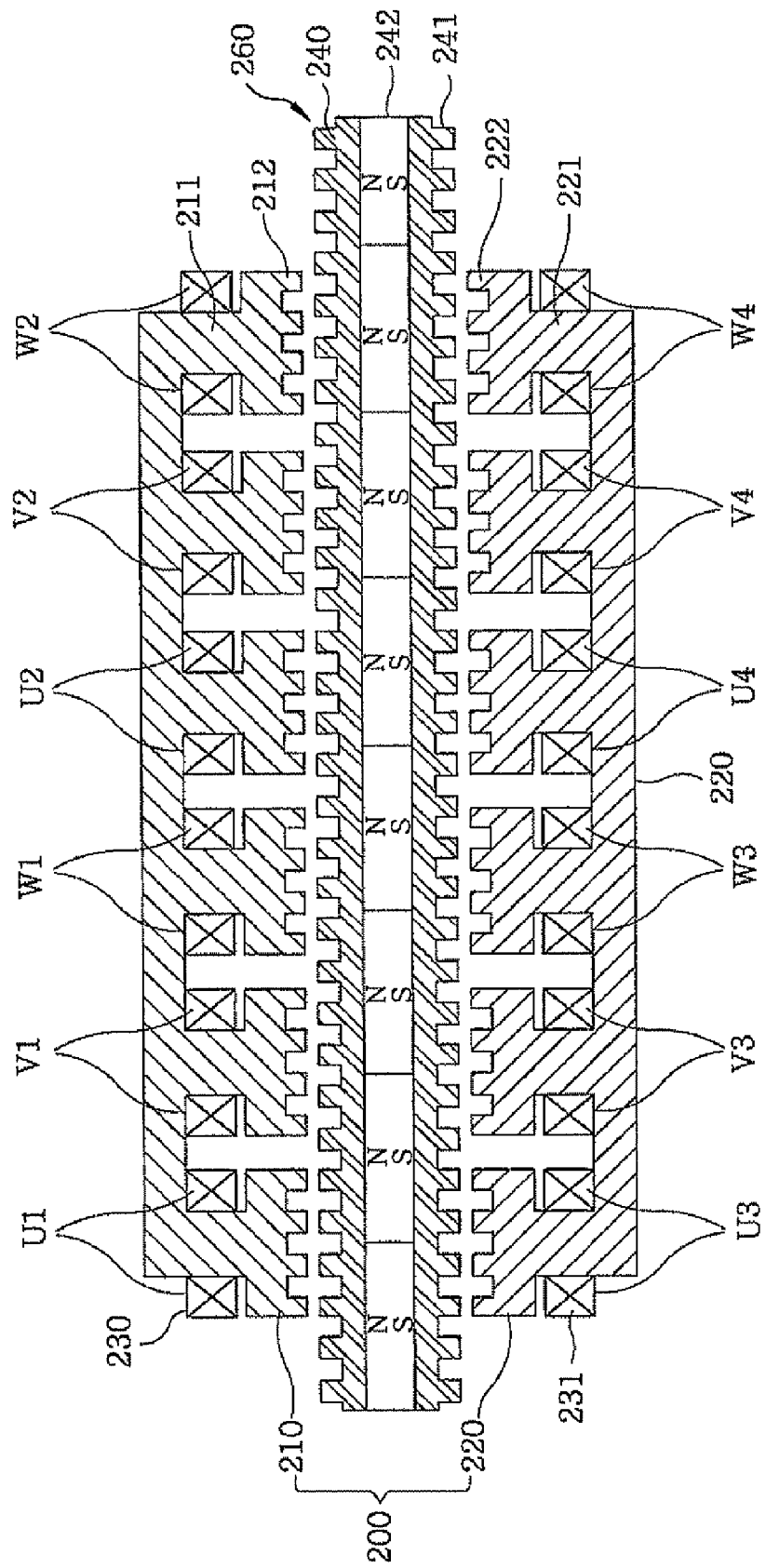
FIG. 8 is a side-sectional view of a hybrid bearingless linear stepping motor according to the third embodiment of the present invention.

FIG. 8 is a side-sectional view of a bearingless linear stepping motor according to the third embodiment of the invention. This linear stepping motor has a structure where a stator 260 which is the same with that of the second embodiment shown in FIG. 6, is divided into the upper and lower parts, and permanent magnets 242 are inserted between the upper and lower parts of the stator 260 so that the upper and lower surfaces of the stator 260 can have magnetic polarities of N and S, respectively. This linear motor is so-called a hybrid type linear motor. By virtue of the bias flux produced by the permanent magnets 242, this hybrid type linear motor can provide the relatively strong thrust force and the high levitation stiffness with respect to current applied thereto.

Figure 9:
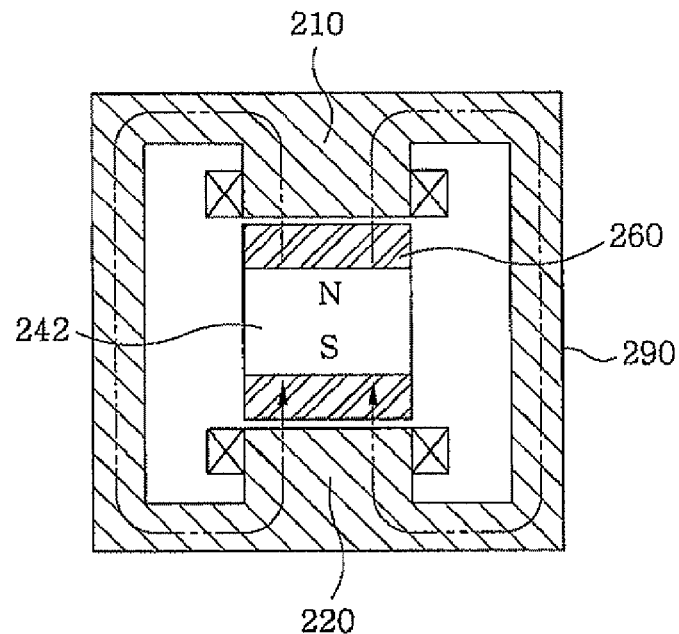
FIG. 9 is a front-sectional view showing a magnetic flux path in the hybrid bearingless linear stepping motor of FIG. 8.

FIG. 9 is a front-sectional view showing a path of the bias magnetic flux in the bearingless linear stepping motor of FIG. 8. The path of magnetic flux becomes 'N pole of permanent magnet 242→teeth 240 on the upper surface of the stator 260→upper air gap→upper cores 211→yoke parts 290→lower cores 221→lower air gap→teeth 241 on the lower surface of the stator 260→S pole of permanent magnet 242'. In this embodiment, the levitation principle and linear driving method are basically the same as the previous case. However, the currents applied to the upper and lower cores are not symmetrical any longer. Due to the polarities of permanent magnets, the currents should have an opposite sign with each other, and further, they may have offsets.

Figure 10:
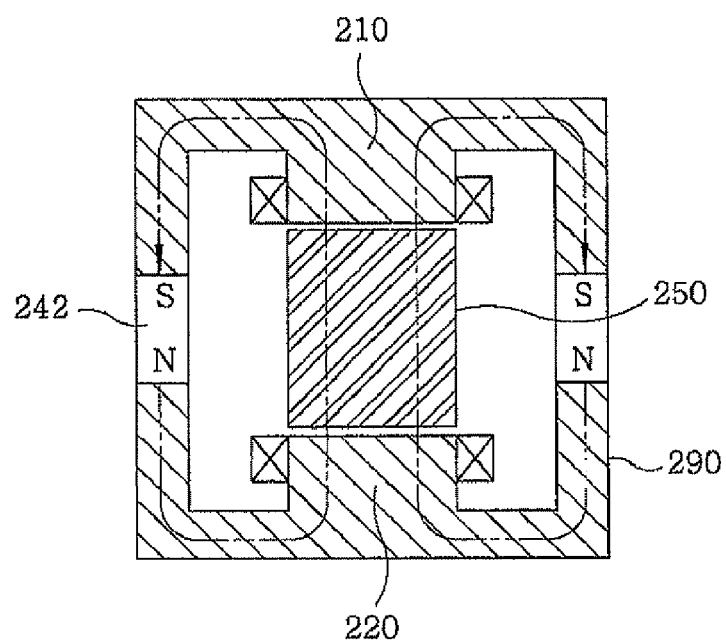
FIG. 10 is a front-sectional view showing a magnetic flux path in a hybrid bearingless linear stepping motor in which permanent magnets are inserted in yoke parts.

Alternatively, the permanent magnets 242 may be also inserted in the yoke parts 290 connecting the upper and lower cores 211 and 221, as shown in FIG. 10. In this case, because the path of magnetic flux generated by the permanent magnets 242 is the same as shown in FIG. 9, the principles of levitation and linear driving method may be the same as before, too.

While the invention has been shown and described with respect to the embodiment, it will be understood by those skilled in the art that various changes and modifications may be made without departing from the scope of the invention as defined in the following claims.

What is claimed is:

1. A linear stepping motor comprising:
a plate-shaped stator having a plurality of teeth symmetrically formed on upper and lower surfaces thereof at regular pitch;
a movable member which includes a plurality of upper cores disposed above the stator, a plurality of lower cores disposed below the stator in symmetrical with the upper cores, and yoke parts connecting the upper and the lower cores around the stator, wherein the upper and lower cores have upper and lower coils individually wound around thereof, respectively;
at least one non-contact type gap sensor to detect the gap between the stator and the upper or lower core;
a controller calculating voltages for levitation and linear movement of the movable member, based on the gap variation; and
a multi-channel voltage-to-current power amplifier having a plurality of channels, each channel being connected to each coil of the upper and lower cores, respectively,
thereby achieving an independent levitation of the movable member and linear driving of the linear motor.

2. The linear stepping motor of claim 1, wherein the currents applied to the upper and lower coils are sine-wave phase currents, of which phase distributions arranged symmetrically with respect to the stator are changed for linear movement, and of which amplitudes increase or decrease by a control current for levitation control as the gap decreases or increases.

3. The linear stepping motor of claim 1, wherein more than one linear stepping motor of claim 1 independently performing the levitation control are combined in parallel or in serial, and actively control the rolling or pitching motions of the movable member in order to achieve the stability in those directions.

4. The linear stepping motor of claim 1, further comprising:
permanent magnets that are inserted into the stator so as to be sandwiched in between the upper part and the lower part of the stator, to form a flux path as 'N pole of the permanent magnet→teeth on the upper surface of the stator→upper air gap→upper cores→yoke parts→lower cores→lower air gap→teeth on the lower surface of the stator→S pole of the permanent magnet'.

5. The linear stepping motor of claim 1, further comprising:
permanent magnets that are inserted into the yoke parts, to form a flux path as 'N pole of the permanent magnet→teeth on the upper surface of the stator→upper air gap→upper cores→yoke parts→lower cores→lower air gap→teeth on the lower surface of the stator→S pole of the permanent magnet'.

* * * * *